United States Patent [19]

Doggett et al.

[11] 4,136,078

[45] Jan. 23, 1979

[54] COMPOSITIONS COMPRISING A PLASTICIZER AND AN N-SULFOHYDROCARBON-SUBSTITUTED ACRYLAMIDE POLYMER

[75] Inventors: Roger H. Doggett, Natick; Henry L. Buccigross, Needham, both of Mass.

[73] Assignee: The Lubrizol Corporation, Wickliffe, Ohio

[21] Appl. No.: 476,014

[22] Filed: Jun. 3, 1974

Related U.S. Application Data

[63] Continuation of Ser. No. 302,339, Oct. 30, 1972, abandoned, which is a continuation of Ser. No. 145,945, May 21, 1971, abandoned.

[51] Int. Cl.$^2$ .......................... C08K 5/05; C08K 5/06
[52] U.S. Cl. .............................. 260/33.2 R; 156/331; 260/31.8 Z; 260/33.4 R
[58] Field of Search ............... 260/79.3 MU, 31.8 Z, 260/33.2 R, 33.4 R

[56] References Cited

U.S. PATENT DOCUMENTS

| | | | |
|---|---|---|---|
| 2,478,378 | 8/1949 | Dickey | 260/79.3 MU |
| 2,566,162 | 8/1951 | Caldwell | 260/79.3 MU |
| 3,255,138 | 6/1966 | Kruckenberg | 117/138.5 |
| 3,260,707 | 7/1966 | Caldwell | 260/79.3 |
| 3,332,904 | 1/1967 | La Combe | 260/33.2 |
| 3,345,320 | 10/1967 | Ulfner | 260/31.6 |
| 3,366,613 | 1/1968 | Kelley | 260/89.5 |
| 3,506,707 | 4/1970 | Miller | 260/513 |
| 3,547,899 | 12/1970 | Arlt | 260/79.3 |
| 3,692,673 | 9/1972 | Hoke | 260/79.3 MU |

*Primary Examiner*—Paul R. Michl
*Attorney, Agent, or Firm*—James W. Adams, Jr.; William H. Pittman

[57] ABSTRACT

Compositions comprising a plasticizer, preferably a polyhydroxy compound, and an N-sulfohydrocarbon-substituted acrylamide polymer, preferably a homopolymer of 2-acrylamido-2-methylpropanesulfonic acid or a salt thereof, are useful as water-activated hot melt adhesives.

3 Claims, No Drawings

COMPOSITIONS COMPRISING A PLASTICIZER AND AN N-SULFOHYDROCARBON-SUBSTITUTED ACRYLAMIDE POLYMER

This application is a continuation of copending application Ser. No. 302,339, filed Oct. 30, 1972, which in turn is a continuation of application Ser. No. 145,945, filed May 21, 1971, both now abandoned.

This invention relates to new compositions of matter useful as adhesives, and more particularly to compositions comprising a plasticizer and at least one polymer containing units of the formula

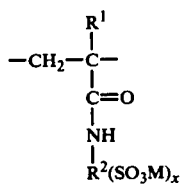

wherein $R^1$ is hydrogen or a lower alkyl or substituted lower alkyl radical; $R^2$ is a divalent or trivalent hydrocarbon or substituted hydrocarbon radical; M is hydrogen or one equivalent of a cation; and x is 1 or 2.

There has been considerable interest lately in the development of water-activated hot melt adhesive compositions. Such compositions are superior in many respects to ordinary water-activated adhesives since the latter must be moistened to apply them to the substrate, and this can cause curling and swelling of a paper substrate. On the other hand, simple hot melt adhesives are sometimes inconvenient to use for adhesion of paper since it is not always practical to provide the heat necessary for their activation.

Most of the water-activated hot melt adhesives previously developed contain a plurality of polymeric ingredients of which at least some are difficult and expensive to obtain. It continues to be of interest, therefore, to develop adhesives which are of simple composition and contain readily available and inexpensive chemicals.

A principal object of this invention, therefore, is to provide improved compositions suitable for use as adhesives.

A further object is to provide compositions containing readily available, inexpensive chemicals which are useful as water-activated hot melt adhesives.

Other objects will in part be obvious and will in part appear hereinafter.

As previously stated, the first essential component of the compositions of this invention is a plasticizer. Suitable plasticizers include polyhydroxy compounds such as glycerol, sorbitol and polyethylene glycols; alcohols such as tetrahydrofurfuryl alcohol; esters such as dibutyl phthalate and butyl phthalyl butyl glycolate; ethers such as polyoxyethylene aryl ethers; and other compounds such as urea, amines, amides, fatty acids, sulfonamides, resins (modified and unmodified), waxes and the like. The only requirement for the plasticizer is that it must be compatible with the polymeric component described hereinafter. Particularly suitable as plasticizers are hydrophilic compounds, especially the polyhydroxy compounds mentioned above.

The second essential component of the compositions of this invention is at least one (usually only one) polymer of an N-sulfohydrocarbon-substituted acrylamide. These polymers are represented by the above formula in which $R^1$ is hydrogen or a lower (as defined hereinafter) alkyl radical and $R^2$ is a divalent or trivalent hydrocarbon radical. As used herein, the term "hydrocarbon radical" includes aliphatic, cycloaliphatic and aromatic (including aliphatic- and cycloaliphatic-substituted aromatic and aromatic-substituted aliphatic and cycloaliphatic) radicals. It also includes cyclic radicals wherein the ring is completed through another portion of the molecule; that is, any two indicated substituents may together form a cyclic hydrocarbon radical.

The following are illustrative of divalent hydrocarbon radicals within the scope of this invention. Where a named radical has several isomeric forms (e.g., butylene), all such forms are included.

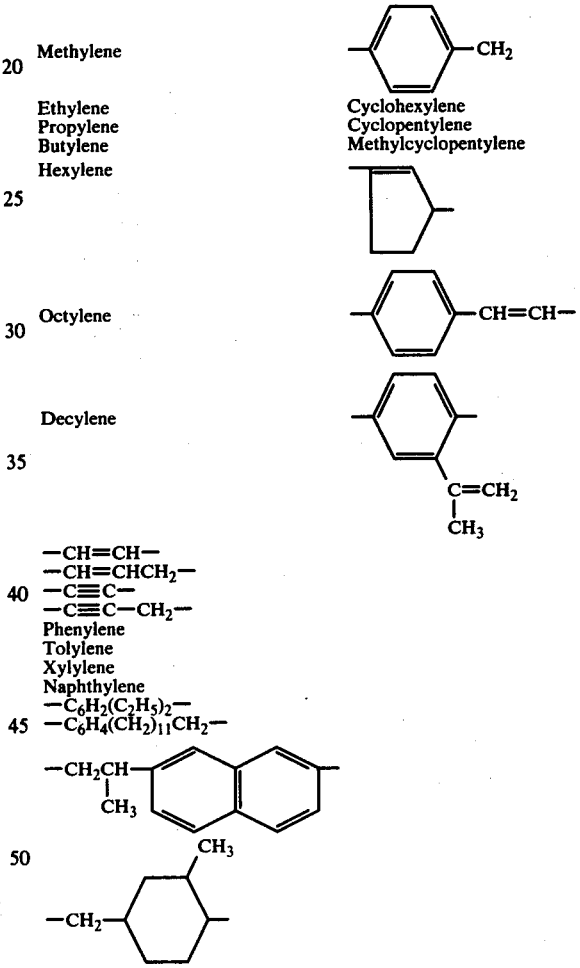

Methylene

Ethylene
Propylene
Butylene
Hexylene

Octylene

Decylene

—CH=CH—
—CH=CHCH$_2$—
—C≡C—
—C≡C—CH$_2$—
Phenylene
Tolylene
Xylylene
Naphthylene
—C$_6$H$_2$(C$_2$H$_5$)$_2$—
—C$_6$H$_4$(CH$_2$)$_{11}$CH$_2$—

Trivalent radicals are similar to the above but have an additional hydrogen atom abstracted.

Many obvious variations of these radicals will be apparent to those skilled in the art and are included within the scope of the invention.

Substituted hydrocarbon, alkyl, aryl, alkylene, arylene, etc., radicals are considered fully equivalent to the hydrocarbon, alkyl, aryl, alkylene, arylene, etc., radicals and to be part of this invention. By "substituted" is meant radicals containing substituents which do not alter significantly the character of reactivity of the radical. Examples are:

Halide (fluoride, chloride, bromide, iodide)

Hydroxy
Ether (especially lower alkoxy)
Keto
Carboxy
Ester (especially lower carbalkoxy)
Aminoacyl (amide)
Amino
Nitro
Cyano
Thioether
Sulfoxy
Sulfone
Sulfonic acid ester, amide, etc.

In general, no more than about three such substituent groups will be present for each 10 carbon atoms in the radical.

Preferably, the hydrocarbon or substituted hydrocarbon radicals in the N-sulfohydrocarbon-substituted acrylamides are free from ethylenic and acetylenic unsaturation and have no more than about 30 carbon atoms, desirably no more than about 12 carbon atoms. A particular preference is expressed for lower hydrocarbon radicals, the word "lower" denoting radicals containing up to seven carbon atoms. Still more preferably, they are lower alkylene or arylene radicals, most often alkylene.

In the formula, M is hydrogen or one equivalent of a cation and is usually hydrogen or alkali metal. $R^1$ is hydrogen or lower alkyl but is preferably hydrogen or methyl, usually hydrogen. $R^2$ may be any divalent or trivalent hydrocarbon radical, preferably lower alkylene or arylene and usually lower alkylene. In a preferred embodiment of this invention, $R^2$ is

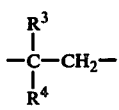

wherein $R^3$ is hydrogen or a lower alkyl radical, $R^4$ is a lower alkyl radical and the sulfonic acid group is attached to the unsubstituted methylene carbon. These polymers may be obtained by the polymerization, either alone or in combination with other polymerizable vinyl monomers, of the corresponding monomeric N-sulfohydrocarbon-substituted acrylamides of which the following acids, and their salts, are examples.

2-Acrylamidoethanesulfonic acid
$CH_2$=$CHCONHCH_2CH_2SO_3H$

2-Acrylamidopropanesulfonic acid

2-Acrylamido-2-methylpropanesulfonic acid

3-Methacrylamidopropanesulfonic acid
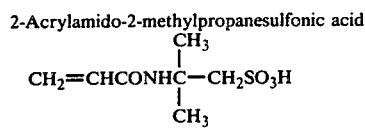

4-Methacrylamidocyclohexanesulfonic acid

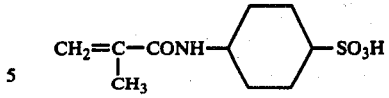

2-Acrylamido-2-phenylethanesulfonic acid
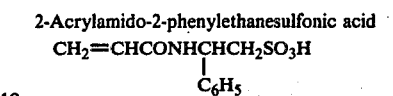

2-Acrylamido-2-phenylpropanesulfonic acid
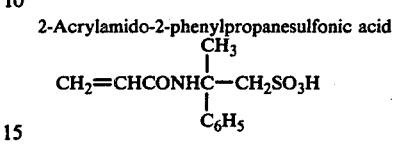

4-Acrylamidobenzenesulfonic acid
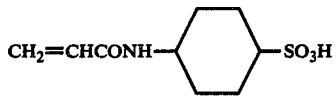

5-Acrylamidobenzene-1,3-disulfonic acid
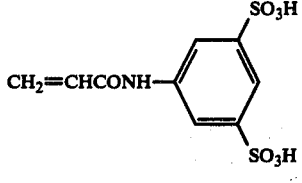

From the standpoint of economy, ease of preparation and polymerization, and effectiveness, the most desirable polymers are those of 2-acrylamido-2-methylpropanesulfonic acid or its salts. The term "N-sulfohydrocarbon-substituted acrylamide" when used hereinafter will refer to this class of compounds generally, with the understanding that the abovenamed compound is especially preferred.

The N-sulfohydrocarbon-substituted acrylamide polymers used in the compositions of this invention may be homopolymers or copolymers, the latter containing at least about 5% by weight, and preferably at least about 50%, of N-sulfohydrocarbon-substituted acrylamide units. The identity of the other monomer or monomers is not critical except that the polymer must be water-soluble or capable of forming a stable aqueous emulsion. The most useful polymers are homopolymers (which are preferred) and copolymers with 5-95%, preferably 5-50% and most desirably 5-30%, of an unsaturated acid (e.g., maleic acid) or a derivative thereof, especially an acrylic monomer such as acrylic or methacrylic acid or a salt or amide thereof, notably acrylamide, methacrylamide, N-methylacrylamide, diacetone acrylamide and the like.

The polymer may be prepared in bulk, solution, suspension or emulsion. Since the polymers are water-soluble, it is frequently convenient to prepare them in aqueous solution. Another method is to prepare an aqueous solution of the monomer or monomers and suspend the same, prior to polymerization, in a water-immiscible solvent such as an aliphatic or aromatic hydrocarbon or halogenated hydrocarbon, removing the water after polymerization. Generally, the sulfonic acid monomer is converted to its metal salt prior to polymerization by means of a suitable alkaline reagent; however, it is also within the scope of the invention to prepare and use a polymer of the free acid. When polymerization is effected in suspension, ordinary suspending agents known to those skilled in the art are used.

The polymerization may be promoted by typical initiators used in aqueous systems, especially peroxides, persulfates, persulfate-bisulfite and the like. It has been found that the alkali metal salts, especially the sodium salt, of 2-acrylamido-2-methylpropanesulfonic acid may frequently be polymerized in the absence of polymerization initiator.

It is sometimes advantageous to carry out the polymerization in the presence of a small amount of chain transfer agent, which tends to cause formation of a polymer with more uniformity in molecular weight than is otherwise produced. Suitable chain transfer agents are known to those skilled in the art.

In addition to the plasticizer and polymer recited hereinabove, the compositions of this invention may contain other ingredients which modify the characteristics thereof, e.g., by improving their remoistening ability, increasing their setting speed, lowering their melt viscosity, increasing their thermal stability and increasing their block resistance. These additives may include fillers such as clay and chalk; antioxidants such as butylated hydroxyanisole, butylated hydroxytoluene and sodium benzoate; tackifiers such as rosin and rosin derivatives, hydrocarbon resins, cumaroneindene and similar resins; lubricants; waxes; pigments; dyes; and flavoring agents.

Illustrative of the compositions of this invention are a series of adhesive compositions prepared by blending glycerol, polyethylene glycol and sorbitol with a homopolymer of sodium 2-acrylamido-2-methylpropanesulfonate, prepared from a suspension in benzene of an aqueous solution of the monomer, using an ammonium persulfate-sodium bisulfite catalyst. The inherent viscosity of the polymer (0.5% w/v solution in 3% aqueous sodium chloride solution at 30° C.) is 1.90. The plasticizers are blended with the polymer to form mixtures containing, in the case of sorbitol, a mixture of equal weights of the two components, and in the cases of glycerol and polyethylene glycol, 50–75% polymer with the remainder being plasticizer. Upon heating, the polymers dissolve in the plasticizers to form a melt which can easily be applied to a paper or other surface and which has sufficient tack to adhere thereto upon cooling. The coating thus obtained, when moistened and adhered to another surface, forms an adhesive bond.

What is claimed is:

1. An adhesive composition comprising glycerol, sorbitol or polyethylene glycol as plasticizer and at least one homopolymer containing units of the formula

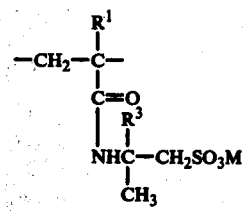

wherein each of $R^1$ and $R^3$ is hydrogen or methyl and M is hydrogen or one equivalent of a cation; said plasticizer comprising about 25–50% by weight of said composition.

2. A composition according to claim 1 wherein M is hydrogen or alkali metal.

3. A composition according to claim 2 wherein $R^1$ is hydrogen and $R^3$ is methyl.

* * * * *